United States Patent [19]

Mooi et al.

[11] 4,238,316

[45] Dec. 9, 1980

[54] TWO-STAGE CATALYTIC PROCESS TO PRODUCE LUBRICATING OILS

[75] Inventors: John Mooi, Homewood; James P. Gallagher, Park Forest, both of Ill.

[73] Assignee: Atlantic Richfield Company, Philadelphia, Pa.

[21] Appl. No.: 922,253

[22] Filed: Jul. 6, 1978

Related U.S. Application Data

[63] Continuation-in-part of Ser. No. 801,948, May 31, 1977, abandoned, which is a continuation-in-part of Ser. No. 687,438, May 17, 1976, abandoned.

[51] Int. Cl.³ .............................................. C10G 47/12
[52] U.S. Cl. .................................... 208/58; 208/111; 252/465; 252/470
[58] Field of Search ..................... 208/18, 58, 59, 111

[56] References Cited

U.S. PATENT DOCUMENTS

| 3,642,610 | 2/1972 | Divijak et al. | 208/58 |
| 3,726,790 | 4/1973 | Gallagher et al. | 208/111 |

*Primary Examiner*—Herbert Levine
*Attorney, Agent, or Firm*—Frank J. Uxa

[57] ABSTRACT

A high viscosity index mineral lubricating oil is produced by processing a heavy hydrocarbon feedstock, e.g., a deasphalted residiuum in two (2) catalytic steps. The feedstock is first catalytically hydrocracked, hydrotreated then catalytically hydrogenated and can be fractionated and dewaxed to provide a finished product. Improved step (1) catalysts comprise at least one Group VIB metal, Group VIII metal and mixtures thereof on a support involving both silica-alumina and alumina.

11 Claims, No Drawings

TWO-STAGE CATALYTIC PROCESS TO PRODUCE LUBRICATING OILS

This application is a continuation-in-part of application Ser. No. 801,948, filed May 31, 1977 which, in turn, is a continuation-in-part of application Ser. No. 687,438, filed May 17, 1976, both now abandoned.

This invention relates to an improved process for the production of high quality mineral lubricating oils. More particularly, this invention relates to the production of such oils employing hydrogen processing of low quality feedstocks.

Many of the present day refining techniques employed to produce high quality mineral lubricating oils having high viscosity indexes possess certain undesirable features. For example, the production of finished oils having a viscosity index of 95 by known methods of fractionation and solvent extraction of vacuum distillates or deasphalted residuums followed by dewaxing and finishing with acid, clay or hydrogen, normally results in yields of about 50 to 65 volume percent.

U.S. Pat. No. 3,642,610 teaches an improved method of producing lubricating oils having increased VI's at increased yields. However, still further improvement in the yields of these valuable lubricating oils is desirable.

Therefore, one object of the present invention is to provide an improved method for producing lubricating oils having increased viscosity indexes.

Another object of the present invention is to provide an improved method for producing high quality lubricating oils in increased yields. Other objects and advantages of the present invention will become apparent hereinafter.

An improved process for preparing a mineral hydrocarbon oil having an increased viscosity index on a dewaxed basis has now been discovered. This improved process comprises (1) contacting a mineral hydrocarbon oil feedstock, preferably a residual oil, of lubricating viscosity, at least about 90% by weight of which boils above about 600° F. and having a viscosity index of about 50 to 85, with molecular hydrogen at hydrocarbon hydrocracking conditions in the presence of a catalyst which comprises a major amount of a catalytically-active support derived by the calcination of a material comprising about 30% to about 70% by weight of silica and about 30% to about 70% by weight of alumina, based on the total silica and alumina in the support, the silica and alumina being supplied by a mixture comprising about 40% to about 90% by weight of amorphous silica-alumina and about 10% to about 60% by weight of alumina derived from hydrous alumina selected from the group consisting of boehmite, amorphous hydrous alumina and mixtures thereof, preferably boehmite and mixtures of boehmite and amorphous hydrous alumina, and a minor, catalytically effective amount of each of at least one metal selected from the group consisting of Group VIb metals, preferably, tungsten, molybdenum and mixtures thereof, and at least one metal selected from the group consisting of the Group VIII metals, preferably the Group VIII iron group metals and more preferably nickel; and (2) contacting hydrocarbon oil of lubricating viscosity from step (1) with molecular hydrogen under hydrocarbon hydrogenation conditions in the presence of a solid hydrogenation catalyst at a hydrotreating severity such that not more than about 5 volume percent of the feed to step (2) boiling above about 600° F. is cracked to material boiling below about 600° F. to produce oil of lubricating viscosity having a viscosity index of at least about 90 and at least about 20 viscosity index numbers greater than the hydrocarbon oil feedstock contacted in step (1).

The mineral lubricating oils treated by the process of the present invention are of lubricating viscosity, e.g., at 210° F., and are principally stocks having at least about 90% by weight boiling above about 600° F. Preferably, such oils are residual mineral oils at least about 90% by weight of which boils above about 1,000° F. By "residual" is meant that such oil is not a distillate, e.g., has not been taken overhead in a distillation column. The feeds are usually oils of at least about 50 VI, e.g., about 50 VI to about 85 VI, or even about 70 VI to about 85 VI, and can be derived, for example, from paraffinic or mixed base petroleum crude oils. The total or full range oil of lubricating viscosity obtained by the method of the present invention has a viscosity index in the range of at least about 90, say up to about 150 or more, with the increase in the viscosity index of the product being at least about 20, preferably at least about 30, numbers over that of the feed mineral oil. Both the initial hydrocarbon feedstock and the product of lubricating viscosity from the hydrogenation step may boil over a considerable temperature range, e.g., over a range of at least about 100° F. and often at least about 200° F. The hydrocarbon feedstock preferably has a specific dispersion (ASTM Designation D-1218) in the range of about 105 to about 165 while the specific dispersion of the product of lubricating viscosity is preferably in the range of about 100 to about 110. The method of the present invention is particularly suitable for treating feedstocks having a specific dispersion in the range of about 135 to about 165, such stocks being the highly contaminated stocks, e.g., containing larger amounts of aromatics. Thus, the present method can utilize an economically cheaper feedstock to produce high quality lubricating oils in high yields.

Hydrocracking of the feedstock, which often includes some ring opening as well as desulfurization and denitrogenation, is carried out in step (1) by contacting the feedstock with a catalyst comprising a major amount of a catalytically active support derived by the calcination of a material comprising about 30% to about 70% by weight of silica and about 30% to about 70% by weight of alumina, based on the total silica and alumina in the support, the silica and alumina being supplied by a mixture comprising about 40% to about 90% by weight amorphous silica-alumina and about 10% to about 60% by weight of a group consisting of boehmite, amorphous hydrous alumina and mixtures thereof, preferably boehmite and mixtures of boehmite and amorphous hydrous alumina, and minor catalytically effective amounts of at least one Group VIb metal and at least one Group VIII metal. This catalyst is preferably boria-free. Thus, this catalyst is free of boria having substantial hydrocarbon conversion catalytic effect in the present process. However, limited amounts of boria not having such an effect and having no substantial deleterious effect on the process or products of the process may be present. The metals may be present in the form of free metals or in combined form such as the oxides and sulfides, the sulfides being the preferred form. Examples of such mixtures or compounds are nickel molybdate or tungstate (or thiomolybdate of thiotungstate). The Group VIb metals preferably are present in the step (1) catalyst in an amount of about 5% to about 40%, more preferably about 10% to about 30% by weight of the total catalyst, calculated as the metal oxide. The Group VIII iron-group metal is usually present in an amount of about 2% to about 15%, preferably about 2% to about 10% by weight of the total catalyst, calculated as the weight of the free metal. The Group VIII platinum group metal can be, for example, about 0.1% to about 3%, preferably about 0.1% to about 1%, by weight of the total catalyst calculated as the elemental metal.

The catalyst composition used in step (1), e.g., the hydrocracking stage, of the present invention can be formed by various means well known in the art, e.g., extrusion, tabletting, spheridizing, and the like, into, for example, extrudates having a diameter of about 1/64 inch to about ½ inch, preferably about 1/64 inch to about ¼ inch, and a length of about 1/64 inch to about ½ inch, preferably about 1/16 inch to about ½ inch, preferably about 1/16 inch to about ¼ inch; and spheres having a diameter of about 1/64 inch to about ½ inch, preferably about 1/16 inch to about ¼ inch. These catalyst particles often have a packed apparent density of about 0.3 gram/cc. to about 1 gram/cc.

The support of the catalyst used in step (1) contains a total of about 30% to about 70% by weight of silica and about 70% to about 30% by weight of alumina, preferably about 35% to about 65% by weight of silica and about 65% to about 35% by weight of alumina. This support is a composite formed by the combination of about 40% to about 90%, preferably about 40% to about 85%, by weight of amorphous silica-alumina and about 10% to about 60%, preferably about 15% to about 60% by weight of alumina derived from hydrous alumina selected from the group consisting of boehmite, amorphous hydrous alumina and mixtures thereof, preferably boehmite and mixtures of boehmite and amorphous hydrous alumina. The amorphous silica-alumina component of the catalyst may be available in the form of relatively finely divided particles, e.g., of a particle size of up to about 65 microns, and contain about 40% to about 92% by weight of silica and about 8% to about 60% by weight of alumina. Commercially available silica-alumina hydrocarbon cracking catalyst particles can be used in making the catalyst used in step (1) of this invention and, in one instance, can contain 87% weight percent silica and 13% weight percent alumina.

While these commercially available powders are relatively finely divided, the average particle diameter may be too large for most effective utilization in forming the catalyst support, for example, the spherical supports useful in the present invention.

Reduction of the size of these particles can be accomplished by milling. The milling can be, for example, wetball milling, dry impact milling, colloidal milling, etc. For more efficient utilization, in the present invention at least about 80 weight percent, preferably at least about 90 weight percent, of the silica-alumina particles should have an average particle diameter of about 44 microns or less. In a more preferred embodiment, at least about 50 weight percent of the silica alumina particles have a diameter of less than about 30 microns in order that the final catalyst particles used in step (1) of the present invention are devoid of or reduced in surface cracks and resulting weakness.

The silica-alumina component of the catalyst used in step (1) of the present invention may also be prepared by conventional methods similar to those methods known to the art for the production of synthetic silica-alumina cracking catalyst. Such preparations may involve forming a silica hydrogel by the precipitation of an alkali metal silicate solution with an acid such as sulfuric acid. Alumina is then precipitated by adding an alum solution to the silica hydrogel slurry and raising the pH into the alkaline range by the addition of sodium aluminate solution or by the addition of a base such as ammonium hydroxide. These conventional methods for producing silica-alumina also include co-precipitation techniques wherein the acid-acting alum solution is added to the silicate solution to precipitate both silica and alumina simultaneously perhaps with a pH adjustment for further precipitation. Also, a constant pH technique whereby the solutions of each oxide component are added continuously to a mixing vessel may be employed. In any event, the alumina is precipitated in the presence of silica to form what may be referred to as coherent aggregates of silica-alumina. Although the silica-alumina component of the present step (1) catalyst supports may have a wide range of surface areas, for example, about 50 m.$^2$/gm. to about 500 m.$^2$/gm. or more, it is preferred that the silica-alumina have a surface area of at least about 300 m.$^2$/gm. The surface areas referred to herein are as determined by the BET nitrogen adsorption procedure (JACS, vol. 60, pp. 309 et seq., 1398).

The added alumina content of the step (1) catalyst support of the present invention is obtained by combining alumina as hydrous alumina with the silica-alumina which may be, at the time of hydrous alumina addition, in any stage of manufacture, from the original crude hydrogel as precipitated and separated from the aqueous supernatant liquid to the completely finished silica-alumina product in either dried or calcined form.

The present step (1) catalyst supports may be prepared by precipitation of hydrous alumina in the presence of the silica-alumina at a pH of about 5 to about 9, or the alumina hydrogel may be prepared separated. In either case, the preparation is such as to produce a support having added alumina in the form derived from hydrous alumina selected from the group consisting of boehmite, amorphous hydrous alumina and mixtures thereof, preferably from the group consisting of boehmite and mixtures of boehmite and amorphous hydrous alumina. The term "boehmite" or "boehmite alumina" includes both well crystallized boehmite and poorly crystallized boehmite, sometimes called pseudoboehmite. Preferably, the boehmite alumina has a crystallite size of up to about 50 A. as determined by X-ray diffraction on samples dried to 110° C. The boehmite crystallite size L, in angstrom units (Å), is an estimate obtained from the width of one of the diffraction peaks, using the Scherrer equation in the form $$L = \frac{0.9\lambda}{B \cos \frac{1}{2} \theta}$$

Here B is the width of the line at half maximum measured in radians, λ is the wave length of the X-rays used in angstrom units (1.54), and θ is the spectrometer angle at which the peak occurs (38°). When mixtures of boehmite and amorphous hydrous alumina are used, the boehmite preferably comprises about 45% to about 85% by weight of the mixture and the amorphous hydrous alumina comprises about 15% to about 55% by weight of the mixture.

The hydrous alumina precursor of the added alumina of the present step (1) catalyst supports can be prepared by various methods. Separate preparation of the hydrous alumina may be, for example, by precipitation of alumina at alkaline pH by mixing alum with sodium aluminate in aqueous solution or with a base such as soda ash, ammonia, etc. The solution from which the hydrous alumina is precipitated may contain a concentration of about 5% to about 20% by weight of the aluminum salt. Ammonia, or more preferably ammonia water, or other aqueous base, can be added to the solution until the desired amount of alumina hydrate gel is precipitated. Preferably, at the end of precipitation, the slurry is so thick that it just barely can be stirred. After formation of the alumina hydrogel is complete, it may be filtered or decanted prior to its combination with the silica-alumina. The alumina hydrogel filter cake may be water washed to remove part or most of its ion content, e.g., sulfate and sodium ion present in the gel, but preferably this step is omitted. Thereafter, the alumina hydrogel is ready for mixing with the silica-alumina material, for example, silica-alumina hydrogel, and the combined hydrogel slurry is stirred continuously until a uniform mixture is obtained, usually about 30 to about 60 minutes stirring time is sufficient. The aqueous hydrous alumina-silica-alumina slurry may then be washed and concentrated as by settling and the aqueous material filtered off after which the catalyst precursor is thoroughly washed to remove interferring ions, especially, sodium and sulfate ions. The final step (1) catalyst support preferably contains less than about 0.5% by weight sulfate.

The hydrous alumina precursor may be prepared in the presence of the silica-alumina component of the present step (1) catalyst supports. In this procedure, the hydrated gel is preferably formed by reacting an aqueous solution of an aluminum salt of a strong inorganic acid, usually aluminum sulfate, with a base preferably ammonia water, at a pH which may vary within the range of about 5 to about 9, preferably substantially all of the alumina is precipitated at a pH of about 7 to about 7.5. Precipitation of alumina from an aqueous solution of an alkali aluminate by addition of an acid may also be employed. Also, the hydrous alumina may be precipitated by hydrolysis from alcohol solutions of aluminum alkoxides although the use of inorganic salts is preferred.

One particularly preferred method for preparing this precursor hydrous alumina is by the conventional acid hydrolysis of finely divided aluminum. In this manner, the dispersion or slurry of hydrous alumina prepared by this method can obtain amorphous alumina as well as boehmite.

In the acid hydrolysis process, aluminum, preferably in a state of extremely fine subdivision and high surface area, is contacted with water, preferably at a temperature near the boiling point of water, in the presence of a non-oxidizing acid. The reaction produces a fine particle hydrous alumina slurry in water, the hydrous alumina comprising either boehmite or both of the valuable boehmite and amorphous forms.

In this hydrolysis process step, the aluminum employed can be finer than most materials referred to as "powder" and the metal can have a surface area of about 75 thousand to about 1 million square millimeters per gram. preferably about 150,000 to about 600,000 mm.$^2$/gm. The aluminum may often be in the general particle size range of about 2 to about 100 microns. Preferably at least about 50 percent of the particles are about 10 to about 40 microns. The aluminum is usually one where at least about 90 percent can pass a 325 mesh sieve (U.S. Standard Sieve Series).

An aluminum suitable for this hydrolysis may have a purity greater than about 99% by weight or even greater than 99.9% by weight and may be obtained by atomizing molten aluminum in air.

Water soluble, organic carboxylic acids generally are preferred for the reaction, in particular, the soluble saturated lower fatty acids, say of 1 to 2 carbon atoms, e.g., formic acid, acetic acid, tri-chloroacetic acid, etc. The monobasic acids are advantageous and formic acid is the most preferred.

The total reaction mixture usually contains a ratio of about one mole acid to about 2 to about 30 gram atoms of aluminum metal to at least about 18, e.g., about 18 to 2,250moles, of water. Preferably about 100 to about 750 moles of water and about 5 to about 15 gram atoms of aluminum are often used per mole of acid.

It may often be preferred to add the aluminum metal and/or the formic acid incrementally to the water during the course of the reaction. Such incremental additions of formic acid and aluminum metal should preferably be at such rates that the approximate 1:5 to 15:100 to 750 acid-aluminum-water ratio described above and the about 3 to about 4 pH are maintained essentially throughout the reaction. Such manipulations accelerate the rate of reaction and provide for improved concentration of $Al_2O_3$ in the product slurry. For ease of handling, the fine aluminum powder may often be transported to the reaction zone as a slurry in water.

Reaction conditions for producing the alumina generally include a temperature of at least about 60° C., although the reaction may be slow below the preferred range of about 90° C. to about 110° C. The reaction can readily take place at a higher temperature, e.g., up to about 500 pounds steam pressure, that is, about 250° C., but pressurized equipment is required at this temperature to keep the necessary liquid phase. At the preferred temperature or below, one atmosphere pressure is satisfactory and water may be refluxed during the reaction. Often the reaction produces a relatively highly concentrated alumina slurry which can be sent directly to an alumina coagulation procedure. Sometimes, however, it may be desirable to further concentrate the slurry and in such cases, additional acid may be used after the reaction to peptize the alumina particles. Subsequent evaporation can then be employed to obtain a pourable thick slurry containing up to about 60 weight percent or more hydrous alumina.

Once the aqueous hydrous alumina-silica-alumina slurry is obtained, particles of the present step (1) catalyst support may be formed, washed, dried and calcined using methods well known in the art. It may be necessary to adjust the free water concentration of the above-noted slurry depending on how the catalyst support particles are to be formed. Tabletting, for example, generally requires a dryer mix than does extruding, which usually calls for a free water content of about 20% to about 40% by weight. Therefore, the slurry may be partially dried. The temperature at which the drying is performed is not critical but it is generally preferred to operate at temperatures up to about 400° F. It may be—because of the type of equipment employed, or for watever reason—that it is preferable to dry the slurry completely, or relatively so, and then add back sufficient water to obtain a formable, e.g., extrudable, coagulable (for spheridizing) etc., mix. In many instances, for example, when the final catalyst is to be in the form of extrudates, tablets, pills and the like, the slurry may be dried, for example, by spray-drying, to form microspherical particles which can be impregnated with the Group VIb and/or Group VIII metal using methods well known in the art. This impregnated material may be formed, dried and calcined using conventional methods to produce the final step (1) catalyst of the present invention. Also, the catalytically-active metals may be added after the support is formed, washed, dried and calcined and when the catalyst is to be in the form of spheres produced by the oil drop method, this procedure is preferred.

The formed particles are calcined at temperatures sufficient to effect the release of water of hydration from the particles and to provide a catalytically active alumina. Generally suitable are temperatures of about 600° F. to about 1350° F., preferably about 800° F. to about 1150° F. The calcination can be effected in an oxidizing, reducing or inert atmosphere, the more economical use of a dry air calcining atmosphere being preferred. It is usually advantageous to calcine in a flowing stream of the gaseous atmosphere. Pressure can be atmospheric, super-atmospheric or sub-atmospheric. Preferably, the final step (1) catalyst has a surface area of at least about 140 m.$^2$/gm.

When the above-noted commercially available silica-alumina particles are to be used in combination with hydrous alumina derived from acid hydrolysis of aluminum to form generally spherical catalyst supports, it is preferred that the silica-alumina particles be added in more or less dry conditions, e.g., either dried-milled or dried, wet-milled, to the acid hydrolysis product to prevent further dilution of the slurry. The mixture of silica-alumina and alumina is fed to a spheridizing column to form the generally spherical support. The spheres can be, for example, up to about ⅛ inch in diameter, often about 1/64 inch in diameter.

The spheres may be prepared by the oil-drop method, for example, as disclosed in U.S. Pat. No. 3,558,508. In the oil-drop method, drops of a coagulable aqueous slurry of the mixture of silica-alumina and hydrous alumina are fed with a column of a water-immiscible liquid, e.g., mineral oil, which can be maintained at close to ambient temperature, e.g., up to about 120° F. The column can also contain a coagulating agent which is preferably gaseous ammonia passing upwardly through the column. As the drops descend in the column essentially firm spheroidal particles are formed. The resulting particles can be collected in the lower portion of the column separated from the water-immiscible or other liquid and, if desired, aged in ammonia water, washed, dried and calcined. If the solid precursor is calcined, the resulting product is a hard, porous spheroidal alumina gel. Calcination is at a temperature which gives a catalytically active alumina, for example, about 800° F. to about 1350° F.

The gelation of the spheroidal particles can be brought about in part by the presence of a coagulating agent in the water-immiscible liquid. Although ammonia is preferred, other coagulating agents can be used. Among the useful materials are the weak bases which are water-soluble and have a strong buffering action at a pH from about 4 to about 10, preferably about 5 to about 9, e.g., hexamethylene tetramine. Various nitrogencontaining bases can be used, e.g., urea, tetramethyl ammonium hydroxide, etc. some of which may release ammonia in the waterimmiscible liquid. The coagulating agent can be mixed with the alumina before the latter is formed into drops providing the alumina is not unduly gelled which may particularly be a problem if too much gelling agent is added or if the mixed material is allowed to sit for too long a time before being released from the drop-forming mechanism. It is preferred, however, that the coagulating agent be mixed with the water-immiscible liquid into which the drops are passed.

A frequently used water-immiscible medium is white mineral oil having a specific gravity of at least about 0.850. The medium utilized is dependent upon the length of the oil column and the specific gravity of the slurry which is in turn dependent upon the total solids concentration in the slurry. If the specific gravity of the oil medium is too low, the spheroidal particles will fall through the column at a high rate which may cause incomplete gelation, thus making the handling and processing difficult. If the specific gravity is too high, this may retard completely the descent of the spheroids. The specific gravity of the feed slurry is often in the range of about 1.150 to about 1.170. The length of the oil column can vary widely depending, for instance, on the speed of coagulation. The column will usually be from about 1 foot to about 30 feet in length, more often about 6 feet to about 20 feet.

The calcined step (1) catalyst support particles, e.g., spheres, may be impregnated with the catalytic metals, e.g., Group VIb and Group VIII metals. The catalytic metals can be present in the final catalyst as the free metals or in combined form such as the oxides and sulfides. Especially preferred catalysts contain nickel together with either tungsten oxide or sulfide or molybdenum oxide or sulfide.

The impregnation can be carried out as is known in the art. The metal is preferably in solution as a compound which is a precursor of the form, e.g., free metal, metal oxide or metal sulfide, desired in the step (1) catalyst. For example, to prepare a catalyst containing nickel and molybdenum oxide (MoO$_3$), a solution of nickel nitrate and ammonium molybdate in ammonia and water can be used as the impregnating solution. The impregnated support can then be dried, as, for example, at a temperature of about 200° F. to about 270° F. for a time such as 15 to 20 hours, and then calcined in flowing air at a temperature of about 900° F. to about 100° F. for about 2 hours to about 4 hours. Alternatively, ammonium molybdate can be dissolved in a solution of aqueous ammonia, prepared by admixing 29% ammonia and water in a ratio of 1.76:1, nickel nitrate is then added in this solution and forms the nickel amine complex

(Ni(NH$_3$)$_6$++)

This solution can then be used as the impregnant with the impregnated support being dried and calcined as before. The impregnation of the support with the catalytic metal solutions can also be performed sequentially, that is, impregnation with a solution of ammonium molybdate in ammonia followed by drying and calcination of the particles and then impregnation of the molybdenum-oxide containing support with a solution of nickel nitrate followed by another drying and calcination. Alternatively, the support may be impregnated with the Group VIII metal first.

The impregnated support can be reduced in hydrogen, as by heating the support in a stream of hydrogen at a temperature of about 400° F. to about 1000° F., preferably about 500° F. to about 800° F. To convert the metal and/or metal oxides in the catalyst to the sulfides, the support containing the metals in oxide form as obtained from the calcination may be sulfided by passing hydrogen sulfide, either pure or diluted with another gas, such as, for instance, hydrogen, over the catalyst bed at temperatures usually below about 800° F., preferably about 400° F. to about 600° F., for a time sufficient to convert a major portion of the oxides of the metal components to their respective sulfides. Alternately, the step (1) catalyst may be sulfided during processing by the sulfur in the hydrocarbon feed. Also, the metals can be deposited in the sulfide form when slurried as the sulfide in the manufacture of the step (1) catalyst.

Step 1 is carried out under conditions to selectively hydrocrack the mineral hydrocarbon oil feedstock so that opening of aromatic and naphthenic rings is favored, rather than the splitting of chains into lower molecular weight compounds. Such conditions preferably include a temperature of about 725° F. to about 875° F., more preferably about 750° F. to about 850° F. The other reaction conditions preferably include a hydrogen partial pressure of about 1,000 psig., to about 5,000 psig., more preferably about 1,500 psig. to about 3,000 psig. In the production of 95 VI oils by the method of this invention, cracking may take place to the extent that from about 5 to about 10 percent by volume of the product of step (1) is material boiling below about 600° F. In the production of 120 VI oils, about 30 to about 40 percent by volume of the product of step (1) may be comprised of such materials. The ratio of free hydrogen to hydrocarbon feed employed in step (1) can be preferably about 1,000 standard cubic feet per barrel of hydrocarbon feed (s.c.f./b.) to about 8,000 s.c.f./b., more preferably about 1,500 s.c.f./b. to about 3,000 s.c.f./b. The weight hourly space velocity (WHSV), weight of feed introduced into the reaction zone per unit weight of catalyst per hour, is preferably in the range of about 0.3 to about 3, more preferably about 0.5 to about 2. The reactor effluent from the step (1), e.g., the hydrocracking stage, can be flashed to prevent hydrogen sulfide and ammonia from going to step (2). However, such processing is not necessary, especially if nonprecious metal catalysts are used in step (2) of the present invention. Also, if desired any light hydrocarbons can be removed from the feed to step (2).

At least a portion of the lubricating oil from step (1) is subjected to step (2), which involves contacting lubricating oil, preferably the essentially full range lube oil from step (1) in the presence of hydrogen with a solid catalyst, preferably at a temperature of about 550° F. to about 825° F., more preferably about 600° F. to about 800° F. It is preferred that the temperature employed in step (2) be at least about 50° F. less than the temperature of step (1) for optimum decolorization and saturation. The other conditions in step (2) preferably include pressures of about 1,000 psig. to about 5,000 psig., more preferably about 1,500 psig. to about 3,000 psig., WHSV of about 0.3 to about 5, more preferably about 0.5 to about 3, and molecular hydrogen to feed ratios of about 500 s.c.f./b. to about 3,500 s.c.f./b., more preferably about 1,500 s.c.f./b. to about 3,000 s.c.f./b.

The solid catalyst employed in step (2), e.g., the hydrogenation operation, is preferably a sulfur-resistant, nonprecious metal hydrogenation catalyst, such as those conventionally employed in the hydrogenation of heavy petroleum oils. Examples of suitable catalytic ingredients are tin, vanadium, members of Group VIb in the periodic table, i.e., chromium, molybdenum and tungsten and metals of the Group VIII iron group, i.e., iron cobalt and nickel. These metals are present in minor, catalytically effective amounts, for instance, about 2 to about 30 weight percent of the catalyst and may be present in the elemental form or in combined form such as the oxides or sulfides, the sulfide form being preferred. Mixtures of these materials or compounds of two or more of the oxides or sulfides can be employed, for example, mixtures or compounds of the iron group metal oxides or sulfides with the oxides or sulfides of Group VIb metals constitute very satisfactory catalysts. Examples of such mixtures or compounds are nickel molybdate, tungstate or chromate (or thiomolybdate, thio-tungstate or thiochromate) or mixtures of nickel or cobalt oxides with molybdenum, tungsten or chromium oxides. As the art is aware and as the specific examples below illustrate, these catalytic ingredients are generally employed while disposed upon a suitable carrier of the solid oxide refractory type, e.g., a predominantly calcined or activated alumina. To avoid undue cracking the catalyst base and other components have little, if any, hydrocarbon cracking activity. Usually, not more than about 5 volume percent, preferably not more than about 2 volume percent, of the hydrocarbon feed to step (2) is cracked in this step to produce materials boiling below about 600° F. Commonly employed catalysts have about 1 to about 10 weight percent of at least one iron group metal (calculated as elemental metal) and about 5 to about 25 weight percent of at least one Group VIb metal (calculated as the oxide). Advantageously, the catalyst is nickel molybdate or cobalt molybdate, supported on alumina. Such preferred catalysts can be prepared by the method described in U.S. Pat. No. 2,938,002.

Other suitable hydrogenation catalysts which can be employed in the method of this invention include the Group VIII platinum group metal types. Such catalysts often have a minor catalytically effective amount, say about 0.05 to about 2 weight percent, preferably about 0.1 to about 1 weight percent of one or more platinum group metals carried on a solid support, especially an active alumina. Preferred platinum group metals include platinum, palladium, rhodium and ruthenium with platinum being more preferred.

The catalysts employed in both the step (1) and (2) hydrogenation stages of the method of this invention are preferably disposed in one or more reaction zones as fixed beds.

Step (2) of the present method often provides additional aromatic saturation, color improvement and stability towards oxidation and corrosion. Additional color improvement can be provided by subjecting at least a portion of the effluent from step (2) to treatment with ultraviolet light. The treatment was found to lighten considerably the color of the darker oils. The reactor effluent from step (2) may be flashed to recover hydrogen for possible recycle and fed to a steam stripper to remove excess light hydrogenated components. The oil can then be fractionated and the lube fractions dewaxed. This dewaxing step can be carried out, for example, by pressing or by solvent dewaxing using methyl ethyl ketone and toluene as the solvent system. Dewaxing may be carried out prior to step (1), but it is preferred to conduct dewaxing after step (2) has been completed. No additional finishing is required.

Increased yields of high quality lubricating oils are obtained by practicing the present invention. For example, yields of about 60 to about 80 volume percent, based on the raw stock, of 95 VI oils are not uncommon and finished base oils having viscosity indexes of 120 and higher are obtained in economical yields, e.g., in the range of about 40 volume percent and higher.

EXAMPLES

The following examples illustrate certain of the benefits of the method of this invention.

A series of five (5) step (1) catalysts were prepared and employed at the hydrocracking conditions described herein.

Each of these step (1) catalysts was prepared using conventional techniques well known in the art. A list of the properties of these catalysts follows.

| CATALYST | A[4][5] | B[7] | C[5] | D[6] | E[7] |
|---|---|---|---|---|---|
| Composition | | | | | |
| Nickel[1], Wt. % | 5.1 | 3.7 | 3.5 | 6.8 | 6.4 |
| Molydenum[2], Wt. % | — | 15.4 | 16.0 | — | — |
| Tungsten[2], Wt. % | 11.3 | — | — | 13.5 | 20.3 |
| Boria, Wt. % | 8.0 | — | — | 13 | — |
| Silica-Alumina, Wt. % | — | 42.7 | 50.7 | 48 | 37.3 |
| Gamma Alumina[3], Wt. % | — | 38.2 | 29.8 | 31.7 | 36.0 |
| Physical Properties | | | | | |
| Surface Area, m.²/gm. | 148 | 169 | 251 | 223 | 137 |
| Total Pore Volume cc./gm. | .42 | 0.83 | 0.39 | 0.39 | 0.71 |

[1]Calculated as elemental metal.
[2]Calculated as the metal oxide.
[3]Derived from hydrous alumina predominating in a mixture of boehmite and amorphous hydrous alumina. Also, the silica-alumina contained 25 wt. % alumina.
[4]Catalyst A is similar to that described in U.S. Pat. No. 3,642,610; the remainder of such catalyst being a conventional alumina support.
[5]In the form of 1/16 inch diameter extrudates.
[6]In the form of ⅛ inch diameter tabletts.
[7]In the form of 5/64 inch diameter beads.

Each of the catalysts, except for Catalyst A, was free of boria.

The test procedure using each of these catalysts was as follows. A propane deasphalted residual oil was used as the hydrocarbon feedstock. This residual oil had the following properties:

| | |
|---|---|
| Viscosity Index (dewaxed basis) (D-227D) | 79 |
| Gravity, °API | 23.2 |
| Viscosity, SUS/210° F. | 33.9 |
| Wt. % Hydrogen | 12.73 |
| Wt. % Sulfer | 0.54 |
| Wt. % Nitrogen | 0.14 |
| Boiling Point (ASTM-D1160) °F. | |
| 5% | 885 |
| 40% | 1051 |

This residual oil was contacted in an isothermal laboratory reaction zone with each of the step (1) catalysts described previously in the presence of hydrogen at the following conditions:

| | |
|---|---|
| PRESSURE, psig. | 2500 |
| H₂ Rate, s.c.f./b. | 2500 |
| WHSV | 1.0 |
| Temperature | as indicated |

Each of the catalysts was presulfided, using conventional techniques.

The resulting hydrocarbon effluents from these contactings were analyzed for viscosity index and weight % yield, on a dewaxed basis. Results obtained from this test procedure are summarized below.

| STEP (1) CATALYST | A | B | C | D[9] | E[9] |
|---|---|---|---|---|---|
| 100 V.I. Oil Produced | | | | | |
| Step (1) Temperature, °F. | 779 | 776 | 778 | 783 | 780 |
| Yield, Wt. % Based on Residual Oil Feedstock | 68 | 70 | 69 | 65 | 66 |
| Relative Activity of Step (1) Catalyst[8] | 1.0 | 1.1 | 1.0 | 0.9 | 1.0 |
| 125 V.I. Oil Produced | | | | | |
| Step (1) Temperature, °F. | 827 | 802 | 811 | 835 | 825 |
| Yield, Wt. % Based On Residual Oil Feedstock | 46.5 | 54 | 49 | 37 | 43 |
| Relative Activity of Step (1) Catalyst[8] | 1.0 | 2.0 | 1.6 | 0.8 | 1.1 |

[8]Relative activity is a measure of the hydro-cracking catalytic activity related to viscosity index improvement of each of the step (1) catalysts based on such catalytic activity of catalyst A.
[9]Because of differences in various experimental factors, e.g., catalyst particle size and shape, the laboratory results obtained using catalysts B, D and E cannot be directly compared to the results obtained with catalyst A.

The hydrocarbon effluent from each of these step (1) contactings is further conventionally contacted with the catalyst and at the conditions set forth for use in the 2nd stage in the Example of U.S. Pat. No. 3,642,610. High VI lubricating oils in good yields are obtained from the effluents of each of these further contactings.

These results clearly demonstrate that the present process provides high yields of lubricating oils with increased viscosity indexes. In addition, the above data show that the present invention, which involves the use of a step (1) catalyst containing both silica-alumina and alumina, provides improved results, e.g., increased yields of high quality lubricating oil, relative to results obtained using a prior art boria-containing catalyst. An additional advantage of the present step (1) catalyst is that of regenerability. That is, the hydrocracking activity of the present silica-alumina and alumina-containing catalyst can be at least partially restored by contacting the deactivated catalyst, e.g., catalyst from processing having carbonaceous material deposited thereon, with an oxygen-containing gas at conditions to combust at least a portion of the carbonaceous deposit material. Attempts to regenerate boria-alumina catalysts in this manner tend to result in reductions in catalyst boron content and, therefore, permanent catalyst deactivation.

The above data and observations make clear the substantial improvement achieved by the present invention. High quality lubricating oils are obtained in improved yields. Moreover, the present step (1) catalyst possess substantial processing advantage over prior art catalysts.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A process for preparing a mineral hydrocarbon lubricating oil having an increased viscosity index, on a dewaxed basis, which comprises 1) contacting a mineral hydrocarbon oil feedstock of lubricating viscosity, at least about 90% by weight of which boils above about 600° F. and having a viscosity index of about 50 to about 85, with molecular hydrogen at hydrocarbon hydrocracking conditions in the presence of a catalyst which is boria-free and comprises a major amount of a catalytically active support derived by the calcination of a material comprising about 30% to about 70% by weight of silica and about 30% to about 70% by weight of alumina, based on the total silica and alumina in said support, said silica and alumina being supplied by a mixture comprising about 40% to about 90% by weight of amorphous silica-alumina and about 10% to about 60% by weight of alumina derived from hydrous alumina selected from the group consisting of boehmite, and mixtures thereof with amorphous hydrous alumina, and a minor, catalytically effective amount of each of at least one metal selected from the group consisting of Group VIb metals and at least one metal selected from the group consisting of Group VIII metals; and (2) contacting hydrocarbon oil of lubricating viscosity from step (1) with molecular hydrogen under hydrocarbon hydrogenation conditions in the presence of a solid hydrogenation catalyst at a hydrotreating severity such that not more than about 5 volume percent of the hydrocarbon feed to step (2) boiling above about 600° F. is cracked to material boiling below about 600° F. to produce oil of lubricating viscosity having a viscosity index of at least about 90 and at least about 20 viscosity index numbers greater than the hydrocarbon oil feedstock contacted in step (1), on a dewaxed basis.

2. The process of claim 1 wherein said amorphous silica alumina contains about 40% to about 92% by weight of silica and about 8% to about 60% by weight of alumina.

3. The process of claim 2 wherein the Group VIb metal is present in the step (1) catalyst in an amount of about 5% to about 40% by weight of the total calalyst, calculated as the Group VIb metal oxide and the Group VIII metal in said step (1) catalyst is selected from the group consisting of an iron group metal, a platinum group metal and mixtures thereof, said iron group metal being present in an amount of about 2% to about 15% by weight of the total catalyst, calculated as the elemental metal, and said platinum group metal being present in an amount of about 0.1% to about 3% by weight of the total catalyst, calculated as the elemental metal.

4. The process of claim 3 wherein said catalytically-active support of the step (1) catalyst is derived by the calcination of material comprising about 35% to about 65% by weight of silica and about 35% to about 65% by weight of alumina, based on the total silica and alumina in the support and supplied by a mixture comprising about 40% to about 85% by weight of amorphous silica-alumina and about 15% to about 60% by weight of alumina derived from hydrous alumina selected from the group consisting of boehmite, and mixtures thereof with amorphous hydrous alumina, and said Group VIII metal in the step 1) catalyst is selected from the group consisting of iron group metals.

5. The process of claim 4 wherein said mineral hydrocarbon oil feedstock is a residual oil and said step (1) catalyst has a surface area of at least about 140 m.²/gm.

6. The process of claim 4 wherein said Group VIb metal in the step (1) catalyst is selected from the group consisting of molybdenum, tungsten and mixtures thereof, and is present in an amount of about 10% to about 30% by weight of the total step (1) catalyst, calculated as the metal oxide, and said Group VIII, iron group metal is present in an amount of about 2% to about 10% by weight of the total catalyst, calculated as the elemental metal.

7. The process of claim 6 wherein said Group VIII metal in the step (1) catalyst is nickel.

8. The process of claim 7 wherein said hydrocarbon hydrocracking conditions include a temperature of about 725° F. to about 875° F., a hydrogen partial pressure of about 1,000 psig. to about 5,000 psig., a ratio of hydrogen-to-hydrocarbon feed of about 1,000 s.c.f./b. to about 8,000 s.c.f./b. and a WHSV in the range of about 0.3 to about 3; and the hydrocarbon hydrogenation conditions include a temperature of about 550° F. to about 825° F., a pressure of about 1,000 psig. to about 5,000 psig., a hydrogen-to-hydrocarbon feed ratio of about 500 s.c.f./b. to about 3,500 s.c.f./b. and a WHSV of about 0.3 to about 5.

9. The process of claim 8 wherein said mineral hydrocarbon oil feedstock is a residual oil and said step (1) catalyst has a surface area of at least about 140 m.²/gm.

10. The process of claim 7 wherein said hydrocarbon hydrocracking conditions include a temperature of about 750° F. to about 850° F., a hydrogen partial pressure of about 1500 psig. to 3,000 psig., a ratio of hydrogen-to-hydrocarbon feed of about 1500 s.c.f./b. to about 3,000 s.c.f./b. and a WHSV in the range of about 0.5 to about 2; and the hydrocarbon hydrogenation conditions include a temperature of about 600° F. to about 800° F., a pressure of about 1500 psig. to about 3,000 psig., a hydrogen-to-hydrocarbon feed ratio of about 1500 s.c.f./b. to about 3,000 s.c.f./b. and a WHSV of about 0.5 to about 3.

11. The process of claim 10 wherein said mineral hydrocarbon oil feedstock is a residual oil and said step (1) catalyst has a surface area of at least about 140 m.²/gm.

* * * * *